United States Patent [19]
Auerbach et al.

[11] Patent Number: 6,078,258
[45] Date of Patent: Jun. 20, 2000

[54] TAG SYSTEM

[75] Inventors: Micha Auerbach, Maccabim; Yosef Haimovich, Rishon LeZion; Rony Cohen, Zoran; Reuven Ilyaev, Tel Aviv, all of Israel

[73] Assignee: HI-G-TEK Ltd., Or-Yehuda, Israel

[21] Appl. No.: 09/110,956

[22] Filed: Jul. 7, 1998

[30] Foreign Application Priority Data

Jul. 7, 1997 [IL] Israel ........................................ 121250

[51] Int. Cl.⁷ ................................................ G08B 13/14
[52] U.S. Cl. ..................... 340/568.2; 340/572.1; 340/568.1; 340/570; 340/571; 340/572.8; 340/572.9; 340/531; 340/825.34; 340/825.54
[58] Field of Search .............................. 340/568.1, 568.2, 340/570, 571, 572.1, 572.8, 572.9, 539, 531, 825.34, 825.54

[56] References Cited

U.S. PATENT DOCUMENTS

| | | | |
|---|---|---|---|
| 3,713,133 | 1/1973 | Nathans | 340/531 |
| 4,656,463 | 4/1987 | Anders et al. | 340/572.4 |
| 5,097,253 | 3/1992 | Eschbach et al. | 340/545 |
| 5,237,307 | 8/1993 | Gritton | 340/572.1 |
| 5,276,431 | 1/1994 | Piccoli et al. | 340/572.5 |
| 5,406,263 | 4/1995 | Tuttle | 340/572.1 |
| 5,512,879 | 4/1996 | Stokes | 340/573.4 |
| 5,570,080 | 10/1996 | Inoue et al. | 340/571 |
| 5,587,702 | 12/1996 | Chadfield | 340/542 |
| 5,644,295 | 7/1997 | Connolly et al. | 340/568.1 |
| 5,656,996 | 8/1997 | Houser | 340/541 |
| 5,721,531 | 2/1998 | Garver et al. | 340/568.2 |
| 5,751,221 | 5/1998 | Stanfield et al. | 340/825.35 |
| 5,751,256 | 5/1998 | McDonough et al. | 343/873 |
| 5,821,870 | 10/1998 | Jackson, Jr. | 340/687 |

*Primary Examiner*—Benjamin C. Lee
*Attorney, Agent, or Firm*—Ladas & Parry

[57] ABSTRACT

A very low power receiver and a transmitter are integrated on one silicon chip, thereby achieving a significant miniaturization of the tag with a long life time, and at the same time offering a significant reduction in unit price, despite requiring the use of a battery. The use of a backup battery helps overcome the range problem, the high cost of the reader, and the environmental problems associated with the emission of very strong magnetic fields.

6 Claims, 4 Drawing Sheets

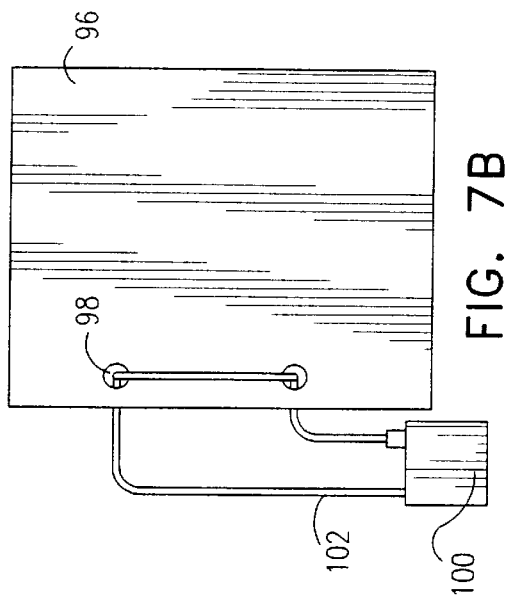# 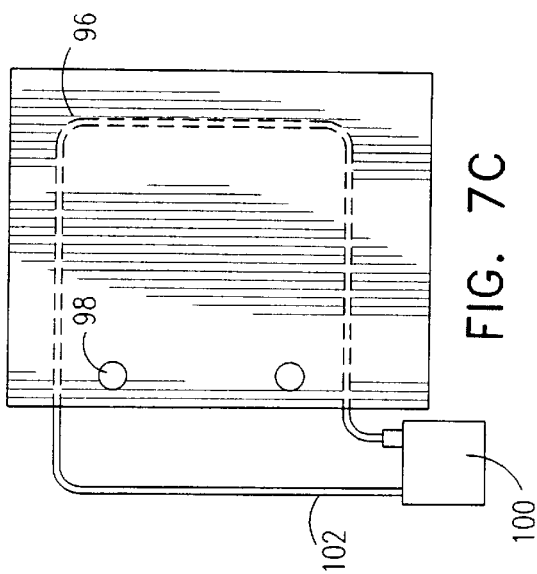# 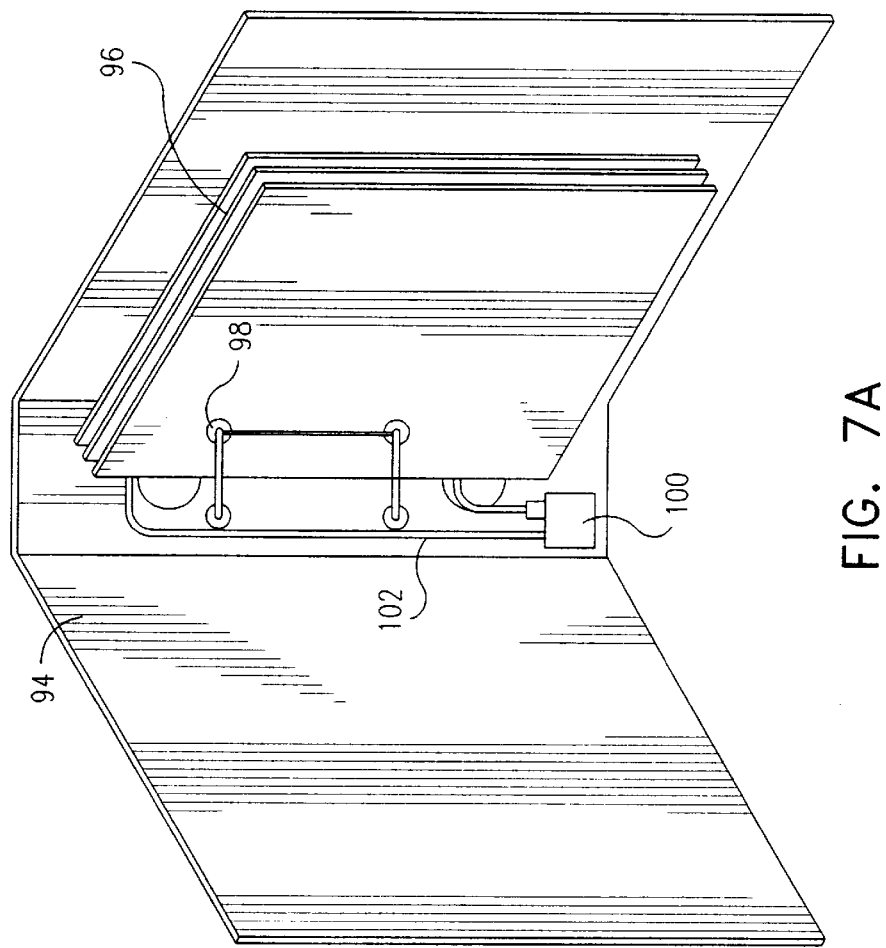
FIG. 7B
FIG. 7C
FIG. 7A

TAG SYSTEM

FIELD OF THE INVENTION

The present invention relates to electronic seals generally, and particularly to RF-interrogated identification tags and electronic seals.

BACKGROUND OF THE INVENTION

It is well known to identify objects with tags that can be monitored, sensed or interrogated from a remote location.

There are several types of RF-interrogated identification tags currently on the market. One example is the SMART Pass system developed by AMTECH Corp. of Dallas, Tex. Their system uses passive RF tags, a little larger than a standard credit card and nearly ½ an inch thick. The tags require a large, high-frequency antenna capable of sending a microwave-frequency RF pulse strong enough to energize the tag to the point where it can return its identification number. The maximum range of the AMTECH system is a few meters. The AMTECH system antenna is designed to be mounted on a metal pole. Its size (38.1 cm×41.7 cm×10.2 cm) and power requirements, are prohibitive for use in an office or hospital environment for tracking capital assets. The system does not allow tracking several objects simultaneously.

Other identification tag systems, such as Texas Instrument's TIRIS system, the Dutch NEDAP monitoring system, and the Israeli On-Track Innovations PorTrac system, are all distance limited solutions for remote, contactless, control of tags and objects. The practical reliable communication distance between tag and object is about 10 cm. Larger distances require very strong magnetic fields, utilizing large and costly hardware associated with them.

Currently available active or passive electronic tagging systems either require a large and costly portable monitoring antenna with limited interrogation range (several score centimeters), or a physical connection to the electronic tag.

SUMMARY OF THE INVENTION

The present invention seeks to provide improved, battery operated, active electronic RF tags that can communicate with a small transceiver over distances of up to few score meters. The system of the present invention allows a user to read many tags at the same time, with a lifetime of several years for each tag.

In a preferred embodiment of the present invention, a very low power receiver and a transmitter are integrated on one silicon chip, thereby achieving a significant miniaturization of the tag with a long life time, and at the same time offering a significant reduction in unit price, despite requiring the use of a battery. The use of a backup battery helps overcome the range problem, the high cost of the reader, and the environmental problems associated with the emission of very strong magnetic fields.

The tag includes a resistive element disposed between the tag body and the object enclosure. Any attempt to remove the tag from the object, will cause an irreversible damage/change to the resistor layer between the tag and the object, resulting in an electronic indication/alarm signal.

The electronic tag is a battery operated device and has a unique 64 bits serial number. The tag transmits its data upon receiving a wake up signal from a transceiver. The transceiver can initiate a search signal automatically, in predefined time intervals, or upon initiation of a signal from a main network computer. The transceivers can be connected together through any kind of LAN system.

After attaching the tag to an object, any attempt to remove the tag from the object will cause a change in the unique code, i.e., resistance associated with the resistive element of the tag. The tag functions both as an identification tag and as an electronic seal.

The electronic seal of the present invention operates with a battery in a sleeping mode of operation, and activates its receiver circuitry only once about every 1.5 sec for a duration of about 10 ms. The measuring and transmitter circuitry is activated only when a wake-up signal is received from the transceiver. In this way an operating range of up to 30 meters may be achieved with a life time of a few years, depending on the number of interrogations per day. The battery may consume less than 10 microamperes of current during sleeping mode.

The transceiver emits a wake-up signal with a duration of more than 1.5 Sec. to ensure reception of all tags in a given area. The tags respond with a random delay, within the required time interval. The system of the present invention can detect and control up to 50 tags in one location with a search time of 2 sec maximum.

Tagged objects may be placed in a cabinet or on a shelf having one or more transceivers built in. In this embodiment the tags may contain circuitry for both active and passive interrogation, and the cabinet or shelf transceivers may be configured accordingly.

There is thus provided in accordance with a preferred embodiment of the present invention an object monitoring system including an electronic tag that transmits in either of active mode or passive mode.

There is also provided in accordance with a preferred embodiment of the present invention an electronic tag including a transceiver, a local power source operatively connected to the transceiver, an energy receiver for receiving energy from a remote power source and transferring energy to the transceiver, and a selector for selectably energizing the transceiver from either of the local power source and the energy receiver.

Further in accordance with a preferred embodiment of the present invention the transceiver transmits using RF transmission.

There is also provided in accordance with a preferred embodiment of the present invention a system for monitoring electronic tags, the system including at least one electronic tag disposed in a cabinet, and at least one transceiver assembled with the cabinet, the transceiver being in communication with the tag.

Further in accordance with a preferred embodiment of the present invention the transceiver transmits using RF transmission.

Still further in accordance with a preferred embodiment of the present invention the cabinet includes at least one shelf.

Additionally in accordance with a preferred embodiment of the present invention the transceiver is assembled with the shelf.

There is also provided in accordance with a preferred embodiment of the present invention a system for monitoring the removal of pages from a folder, the system including a folder having at least one page placed therein, and an electronic seal including, an electronic tag, and a multiplicity of wires electrically connected to the tag, the at least one of the wires is assembled with the page.

Further in accordance with a preferred embodiment of the present invention any of said wires are resistive.

Still further in accordance with a preferred embodiment of the present invention any of said wires are conductive.

Additionally in accordance with a preferred embodiment of the present invention only a random number of said wires are electrically connected to said tag.

Further in accordance with a preferred embodiment of the present invention the page has at least one aperture formed therein and the at least one of the wires passes through the aperture.

Still further in accordance with a preferred embodiment of the present invention the at least one of the wires is embedded in the page.

BRIEF DESCRIPTION OF THE DRAWINGS

The present invention will be understood and appreciated more fully from the following detailed description, taken in conjunction with the drawings in which:

FIGS. 7A, 7B, and 7C are simplified pictorial illustrations of a tagged object constructed and operative in accordance with a preferred embodiment of the present invention.

DETAILED DESCRIPTION OF A PREFERRED EMBODIMENT

Figure 1:
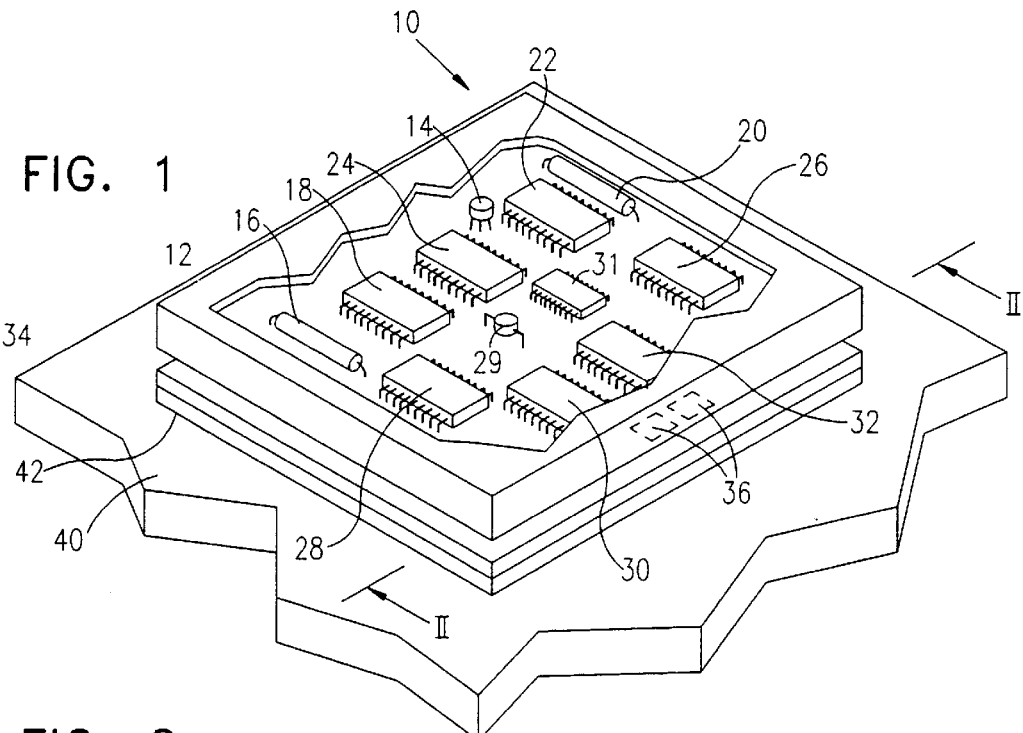
FIG. 1 is a simplified pictorial illustration of an electronic seal, including an electronic tag and an electrically resistive element, constructed and operative in accordance with a preferred embodiment of the present invention.
Figure 2:
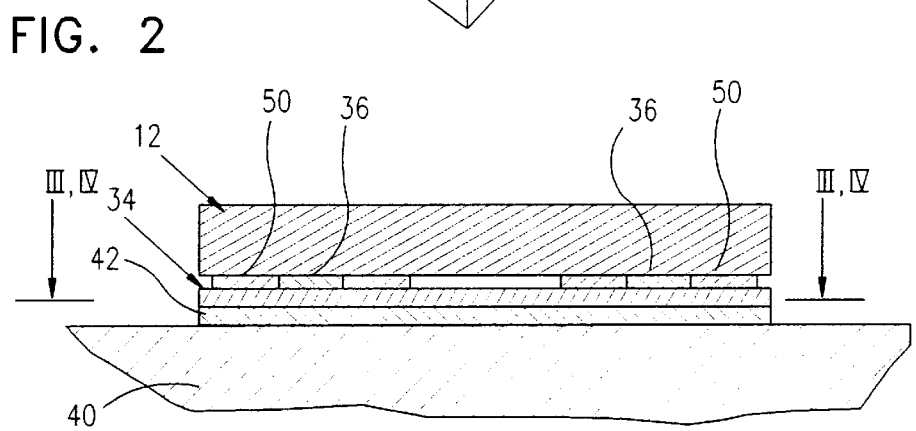
FIG. 2 is a simplified sectional illustration of the electronic seal of FIG. 1, taken along lines II—II in FIG. 1.

Reference is now made to FIGS. 1 and 2 which illustrate an electronic seal 10 constructed and operative in accordance with a preferred embodiment of the present invention.

Electronic seal 10 includes an electronic tag 12 which preferably includes electronics comprising a battery 14, a receiver antenna 16, receiver circuitry 18, a transmitter antenna 20, transmitter circuitry 22, a microprocessor 24, a timer 26, a logic and memory component 28, an analog-to-digital (A/D) converter 30 and a current source 32. The electronics of tag 12 is not limited to the abovementioned components, and may include more or less components, depending upon the application. Such additional components may include components for passive interrogation such as an energy receiver 29 for receiving proximate RF energy and a selector 31 for switching between active and passive transmission modes.

The electronics of tag 12 are in electrical communication with an electrically resistive element 34, such as via I/O pads 36. Element 34 is preferably bonded to an object 40 with an adhesive 42 so as to define an electrical resistance. Any change in bonding of element 34 to object 40 causes a change in the electrical resistance. Adhesive 42 may be a double sided adhesive tape or adhesive foam.

Figure 3:
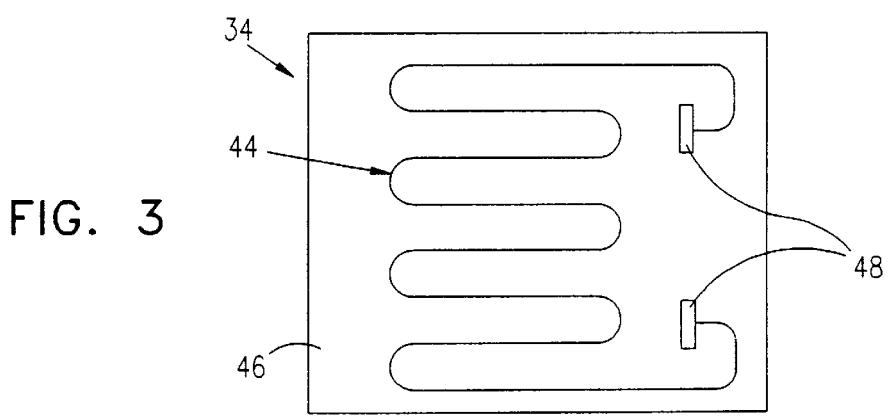
FIG. 3 is a simplified sectional illustration of the resistive element of FIG. 1, taken along lines III—III in FIG. 2.

The resistive element of the present invention may be constructed in a variety of manners. Reference is now made to FIG. 3 which illustrates resistive element 34, constructed and operative in accordance with one embodiment of the present invention. A resistive ink 44, preferably polymer based, is applied to a flexible material 46, such as polyester or polyimide films, e.g., MYLAR or KAPTON. Resistive ink 44 may be applied in a variety of manners, e.g., screen printing, roller coating, dipping, transfer deposition, or any other process that provides a controlled coating. Resistive ink 44 is printed on material 46 in any suitable pattern to provide a desired resistance value which may be adjusted after curing by laser trimming, abrasion or mechanical punching, for example. Preferably I/O pads 48 are connected to the pattern of resistive ink 44, pads 48 being in electrical communication with I/O pads 36 of tag 12.

Resistive element 34 is preferably attached to tag 12 by means of a conductive adhesive 50, such as a metal impregnated adhesive. Preferably the adhesive strength of adhesive 42 is greater than the adhesive strength of conductive adhesive 50, so that removal of tag 12 from object 40 causes shearing or other deformation of conductive adhesive 50, and alters the resistance of resistive element 34. Alteration of the resistance of element 34 may be stored in memory component 28 and/or may be transmitted via transmitter 22 and antenna 20 to a detection system (not shown).

Figure 4:
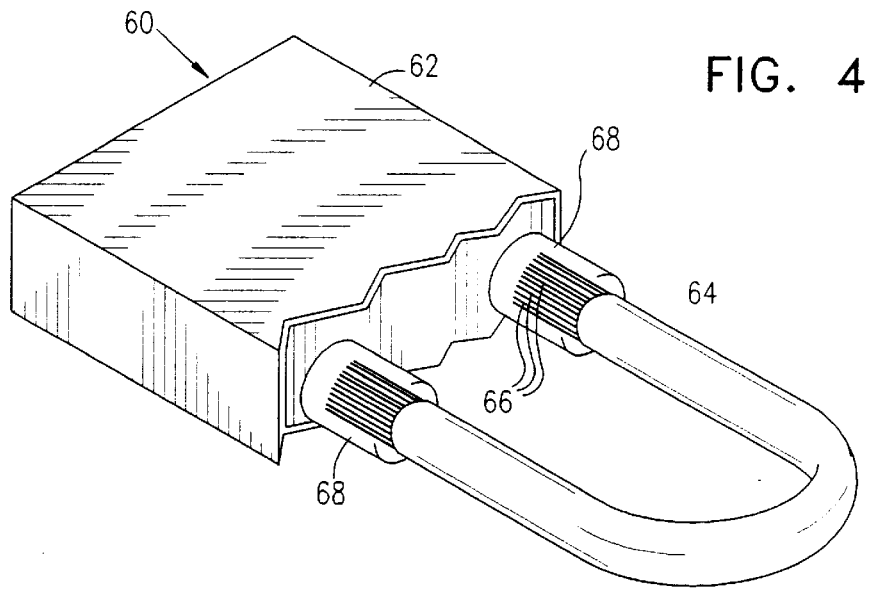
FIG. 4 is a simplified pictorial cutaway illustration of an electronic seal, including an electronic tag and an electrically resistive element, constructed and operative in accordance with another preferred embodiment of the present invention.

Reference is now made to FIG. 4 which illustrates an electronic seal 60, constructed and operative in accordance with another preferred embodiment of the present invention. Electronic seal 60 includes a tag 62 which preferably includes electronics substantially identical to electronics of tag 12 of seal 10. Electronic seal 60 includes a resistive element 64 which comprises a multiplicity of wires 66, preferably constructed of a high resistivity material such as nickel chrome. Each wire 66 is preferably insulated from each other and from the external world. Wires 66 are attached to internal I/O pins 68 of tag 62, such as by crimping or soldering, preferably wherein only a random number of wires 66 are electrically connected to pins 68 and the remainder of wires 66 are not connected to pins 68. The random connection results in a statistically random electrical resistance of resistive element 64, which resistance cannot be measured from the outside of tag 62.

Seal 60 may be potted for added protection from the environment. Seal 60 is preferably attached to an object (not shown) in a manner substantially similar to seal 10, as described hereinabove. Removal of tag 62 from the object causes shearing or other deformation of wires 66, and alters the resistance of element 64. Alteration of the resistance of element 64 may be stored in memory component 28 (not shown in FIG. 4) and/or may be transmitted via transmitter 22 and antenna 20 to a detection system (all not shown in FIG. 4).

Figure 5:
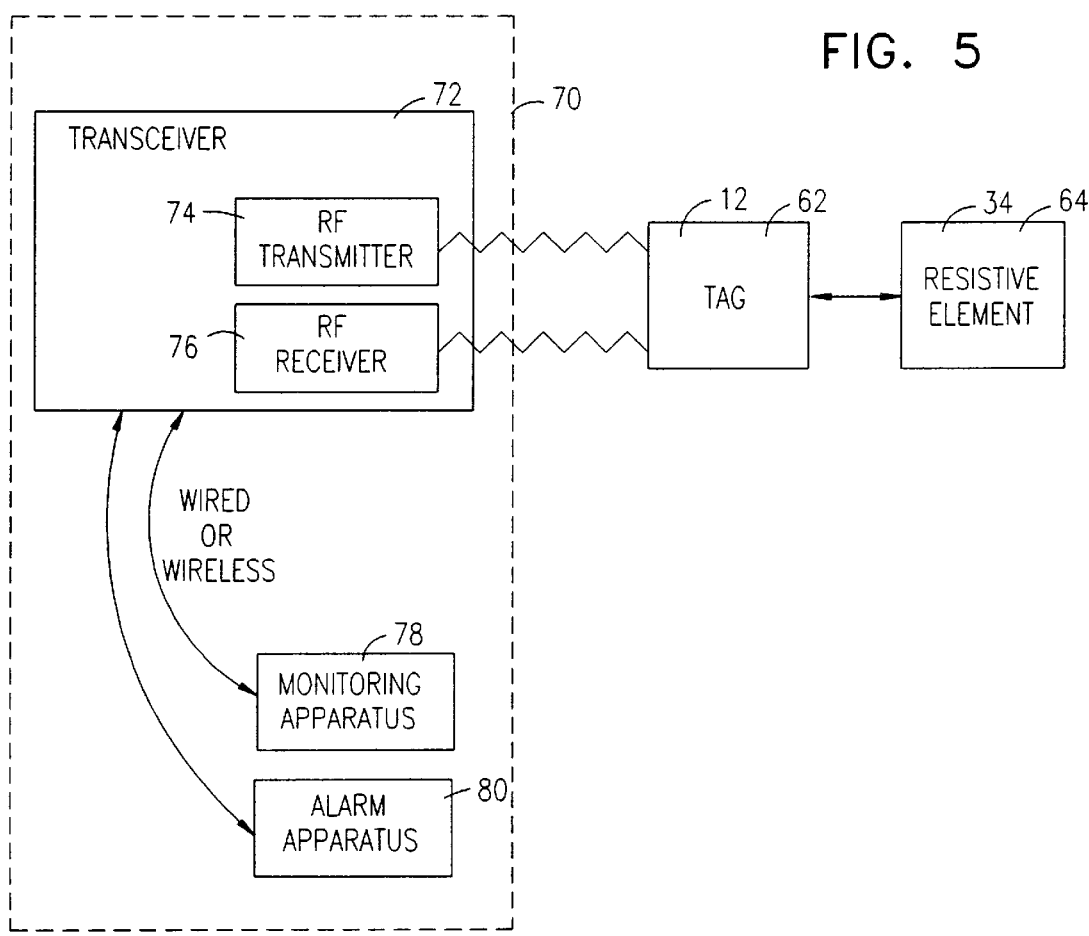
FIG. 5 is a simplified block diagram of the electronic seals of FIGS. 1 and 4 used in a detection system, constructed and operative in accordance with a preferred embodiment of the present invention.

Reference is now made to FIG. 5 which illustrates a simplified block diagram of the electronic seals of FIGS. 1 and 4 used in a detection system 70, constructed and operative in accordance with a preferred embodiment of the present invention.

Detection system 70 preferably includes a transceiver 72 which communicates with either tag 12 or 62 via an RF transmitter 74 and an RF receiver 76. Transceiver 72 preferably also communicates with monitoring apparatus 78 and/or alarm apparatus 80, via wired or wireless communication, such as a LAN.

Preferably tag 12 or 62 operates in a sleeping mode so as to conserve energy of battery 14. Tag 12 or 62 is activated only upon receipt of a wake-up signal from transceiver 72. Once tag 12 or 62 is activated, any change in electrical resistance of resistive element 34 or 64, respectively, is communicated or monitored. For example, the change in resistance may be stored in memory component 28 and/or relayed to transceiver 72 and thence to either monitoring apparatus 78 or alarm apparatus 80. Timer 26 and/or memory component 28 may be used to monitor time and duration of the change in electrical resistance.

Preferably memory component 28 stores at least one of identification data and asset data. Transceiver 72 may interrogate tag 12 or 62 for the identification and/or asset data. The asset data may include a variety of information about the object being monitored, including inventory and sub-inventory information.

Figure 6:
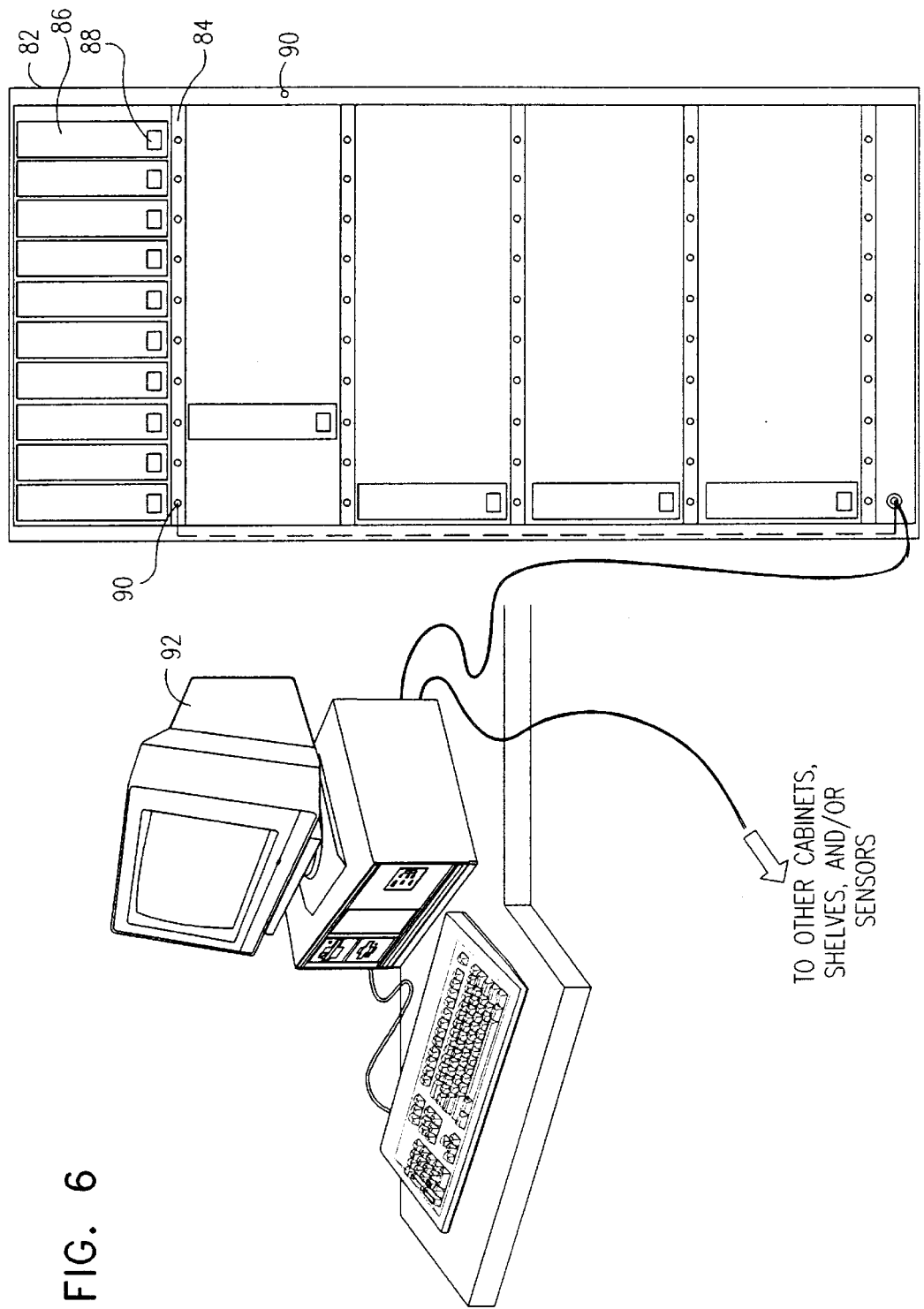
FIG. 6 which is a simplified pictorial illustration of an object tagging and storage system constructed and operative in accordance with a preferred embodiment of the present invention.

Reference is now made to FIG. 6 which is a simplified pictorial illustration of an object tagging and storage system constructed and operative in accordance with a preferred embodiment of the present invention. A cabinet 82 is shown, typically comprising one or more shelves 84 on which one or more objects 86 may be placed. Each object 86, such as a document folder, is preferably tagged with an electronic seal 88 such as is described hereinabove with reference to FIG. 1. Seal 88 is preferably interrogatable in either of active and passive modes. Either of cabinet 82 and shelf 84 preferably comprises one or more transceivers 90, such as is described hereinabove with reference to FIG. 5, mounted thereupon or otherwise built-in. Each transceiver 90 is preferably in wired or wireless communication with one or more computers 92 which monitor object locations. Each object 86 may be polled periodically or continually by one or more transceivers 90, in either of active and passive modes. Upon being interrogated each electronic seal 88 then preferably transmits identifying information to transceiver 90 as is known or as described hereinabove with reference to FIG. 5. Several cabinets, shelves, transceivers, and computers may be interconnected in a network as is well known.

Reference is now made to FIGS. 7A, 7B, and 7C which are simplified pictorial illustrations of a tagged object constructed and operative in accordance with a preferred embodiment of the present invention. An object 94, such as a document folder, is shown, typically comprising one or more sheets 96, with each sheet 96 having one or more apertures 98 formed therein. An electronic seal 100, such as is described hereinabove with reference to FIG. 4, is typically attached to object 94. A sealing wire 102 preferably passes through one or more apertures 98. Electronic seal 100 is preferably configured to detect the removal of any sheet 96 wherein sealing wire 102 is detached from electronic seal 100. Alternatively or additionally, sealing wire 102 may be assembled with sheet 96, such as embedding sealing wire 102 in sheet 96, as is shown more particularly with reference to FIG. 7C.

It is appreciated that the resistive wires or elements described hereinabove with reference to FIGS. 1–7C may be replaced by or augmented by conductive wires or elements, in which case the conductivity of the conductive wires or elements is measured in place of or in addition to resistivity.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the present invention is defined only by the claims which follow:

What is claimed is:

1. A system for monitoring the removal of pages from a folder, the system comprising:

a folder having at least one page paced therein; and
   an electronic seal comprising:
   an electronic tag; and
   a multiplicity of wires electrically connected to said tag;
   wherein at least one of said wires is assembled with said page, so that removal of said page alters the at least one of said wires and registers at said electronic tag said removal.

2. A system according to claim 1 and wherein any of said wires are resistive.

3. A system according to claim 1 and wherein any of said wires are conductive.

4. A system according to claim 1 and further comprising an electrically resistive element in electrical communication with and attached to said tag, said electrically resistive element having an electrical resistance, wherein tampering with said electrically resistive element causes a change in said electrical resistance, said change in electrical resistance being communicated to said tag wherein only a random number of said wires are electrically connected to internal connection points in said tag such that said resistive element has a statistically random electrical resistance.

5. A system according claim 1 and wherein said page has at least one aperture formed therein and wherein at least one of said wires passes through said aperture.

6. A system according to claim 1 and wherein at least one of said wires is embedded in said page.

* * * * *